Sept. 29, 1936.　　　　G. H. FRASER　　　　2,055,485
SEPARATOR
Filed March 10, 1934　　　3 Sheets-Sheet 1
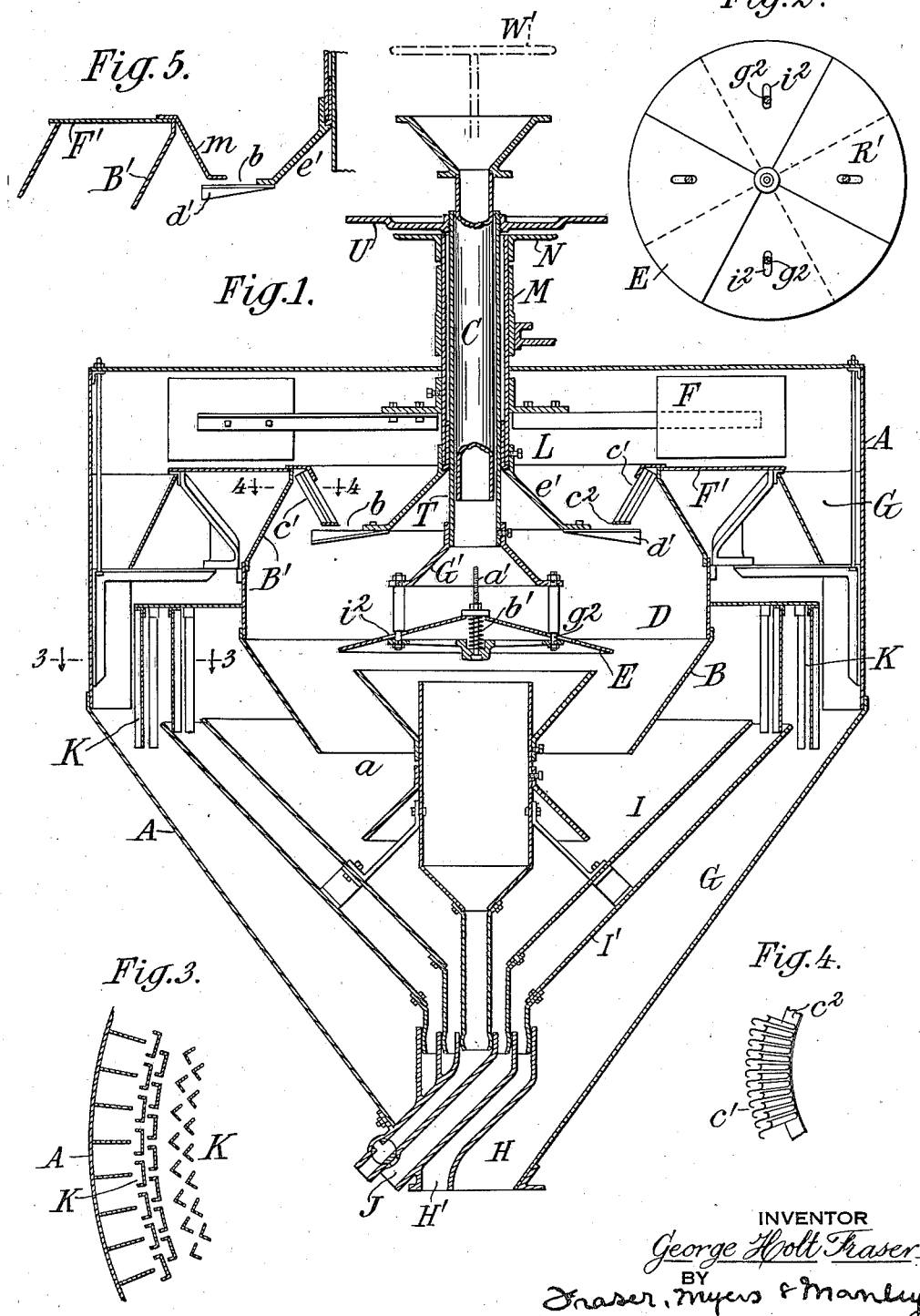

Sept. 29, 1936.                G. H. FRASER                2,055,485
                                 SEPARATOR
                            Filed March 10, 1934           3 Sheets-Sheet 2
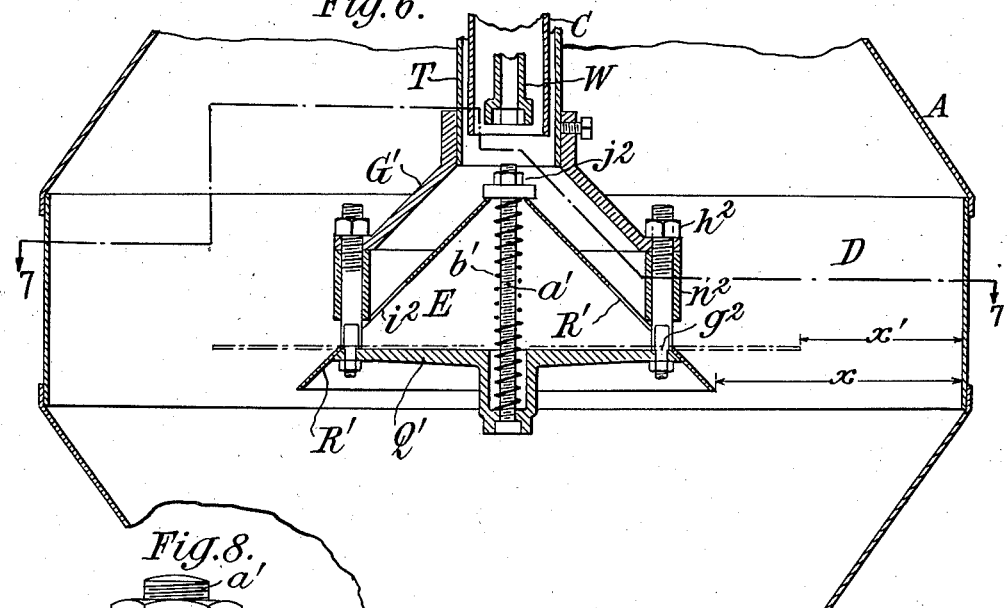
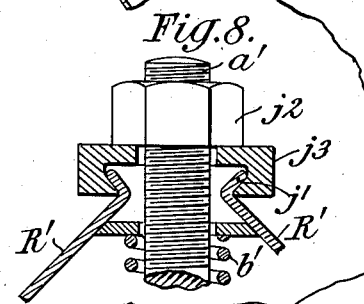
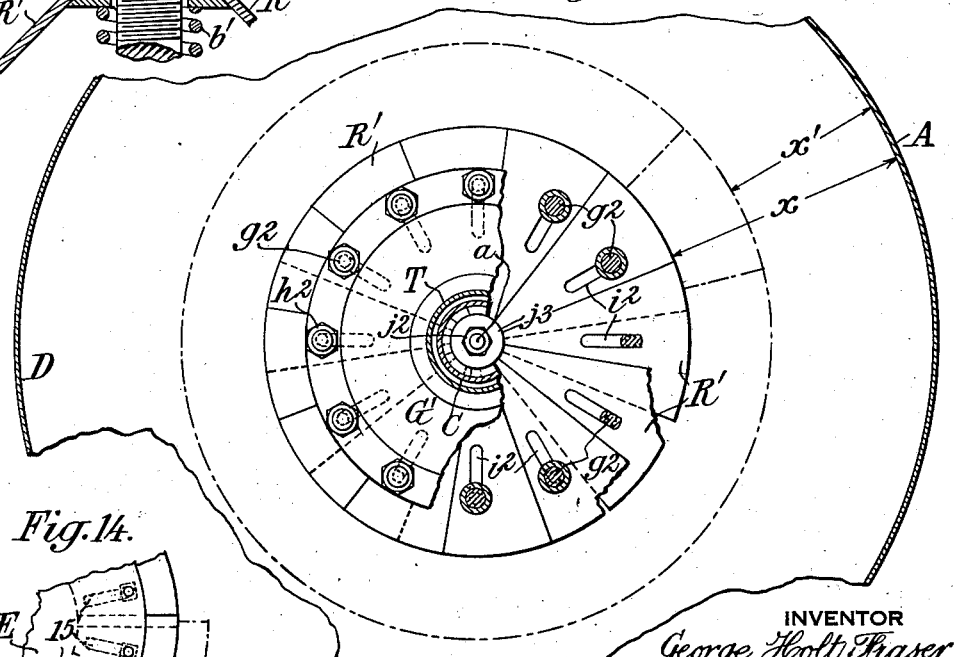
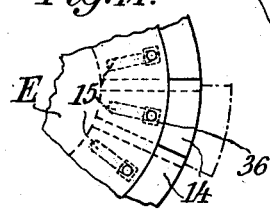
INVENTOR
George Holt Fraser,
BY
Fraser, Myers & Manley
ATTORNEYS Sept. 29, 1936.　　　G. H. FRASER　　　2,055,485
SEPARATOR
Filed March 10, 1934　　　3 Sheets-Sheet 3
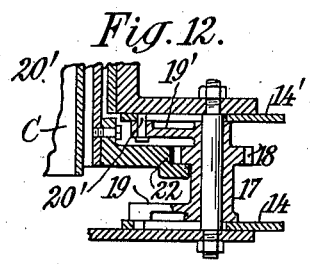
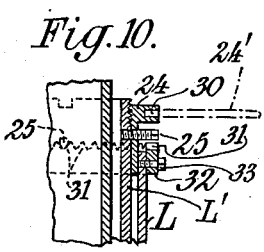
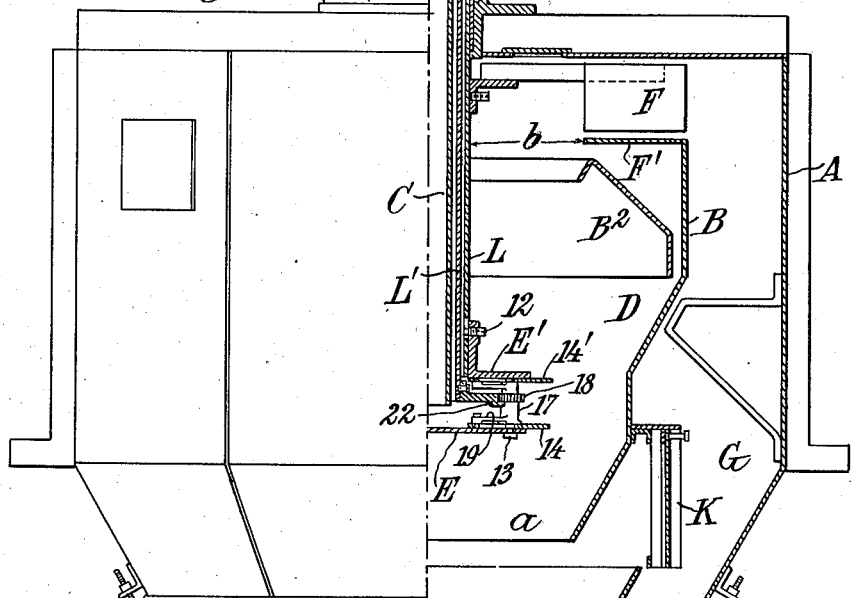
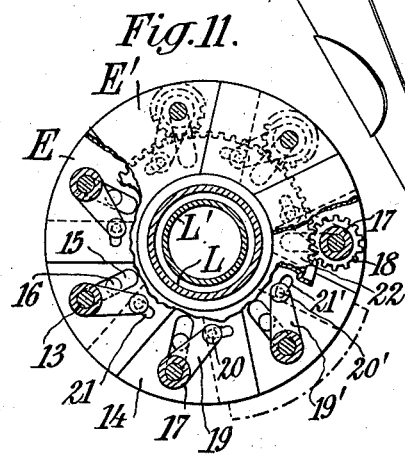
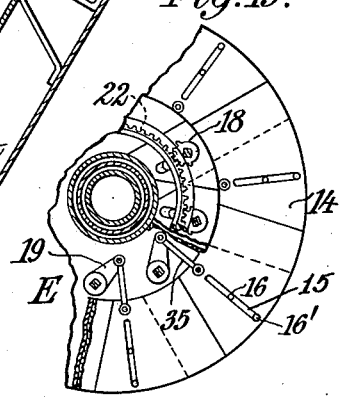
INVENTOR
George Holt Fraser,
BY
Fraser, Myers & Manley
ATTORNEYS.

Patented Sept. 29, 1936

2,055,485

UNITED STATES PATENT OFFICE 2,055,485

SEPARATOR

George Holt Fraser, Brooklyn, N. Y.

Application March 10, 1934, Serial No. 714,961

16 Claims. (Cl. 209—139)

This invention relates to separators for separating dust or lighter material from heavier material by the action of a current of air or other fluid. It relates to separators of the "vortex ring" type wherein fluid current circulates upwardly within an annular wall and downwardly exterior thereto (or the reverse), the separation taking place in the chamber within such wall and the precipitation of the separated dust being accomplished exteriorly of said wall. It is also applicable to separators wherein the air or other fluid, instead of circulating downwardly around such wall and returning to ascend therethrough, is conducted elsewhere for recovering the separated dust. Such separators are applicable not only for dust or light air-borne materials such as flour, but also for the separation of substances floating in a liquid medium.

The present application is a continuation in part of my original application, Serial No. 687,359, filed January 19, 1924, and a continuation in part of my application, Serial No. 514,199, filed February 7, 1931, and a continuation in part of my application, Serial No. 584,140, filed December 31, 1931.

In all separators of the vortex ring type the material to be separated is introduced, usually centrally and axially, within a separating chamber and projected thereinto across the fluid current by a distributor which is usually a rotating disk receiving the material at its central portion from the inlet passage and throwing it concentrically across the fluid current within the separating chamber so that the heavier parts or particles fall through the current and are discharged by gravity at a tailings outlet, while the lighter material is carried by the current and is eventually precipitated therefrom.

The present invention provides improvements in the construction of the distributor whereby to provide for the adjustment and control of the distribution and of the initial separation. Between the distributor, which is usually a circular disk, and the wall of the separating chamber, which is usually circular and concentric with the distributor, there is afforded an annular space or zone through which the fluid current passes to effect the initial separation. With a given current, due to the operation of a fan or blower at a given speed, the concentration of current in this annular space or zone, and consequently its speed and lifting effect, may be varied by varying the area of such annular space or zone. For varying such area two means are possible, namely, by making the wall adjustable outwardly or inwardly, or by making the distributor adjustable to vary the diameter of its outer margin or perimeter. The present invention relates to the second of these means.

It has heretofore been customary to vary the area of such zone by entering the separator casing, disconnecting the distributor disk from its hub or revolving shaft and substituting for it a disk of larger or smaller size; or by constructing the disk to provide for the addition or removal of annular segments whereby its effective diameter may be increased or diminished. These methods are laborious and expensive, requiring that provision be made for the entry of workmen within the separator to perform difficult and tedious operations, and they incapacitate the separator from use for a considerable time.

The present invention provides means whereby the effective diameter of the separator may be readily and quickly varied by an adjustment performed without requiring any substitution of parts and preferably by manipulation from the exterior, through suitable internal connecting means.

Accordingly the invention provides a distributor of segmental construction, the segments being capable of adjustment whereby their outer margins may be set out or in relatively to the central axis of rotation, whereby to vary the effective diameter of the distributor as a whole and thereby to vary the area of the surrounding annular space or zone. In the preferred construction the segments are radially movable or adjustable, and adjusting means are provided for moving them collectively. The adjustable means is preferably made accessible from the exterior of the separator casing, preferably at the top thereof, and through or adjacent the central tubular conduit or passage down which the material to be separated is fed.

In such separators it is also sometimes desirable to vary the area of an annular space within the separating chamber at some other level than the distribution zone in order to control the velocity of the upward current through such space as compared with its movement in other portions of the chamber. For such purpose the same segmental construction is applicable as for the distributor. Accordingly, the invention in its broader aspect provides an assembly comprising a plurality of adjustable segmental plates disposed centrally or in approximation thereto within the separating chamber, said plates outwardly and inwardly movable to vary the area of the space between said assembly and the casing or wall enclosing said chamber, whereby to vary the current flowing through such space.

In the accompanying drawings:

Figure 1 is a vertical mid-section of a separator to which one form of the distributor provided for this invention is applied. This figure is taken from Fig. 1 of my original application, Serial No. 687,359, omitting certain portions of the apparatus which are unessential to the present invention.

Fig. 2 is a plan of a simple or elementary form of the distributor shown in Fig. 1.

Fig. 3 is a fragmentary horizontal section in the plane of the line 3—3 of Fig. 1.

Fig. 4 is a fragmentary horizontal section in the plane of the line 4—4 in Fig. 1.

Fig. 5 is a fragment of Fig. 1, showing a modification.

Fig. 6 is a vertical transverse section on a larger scale showing more in detail a construction of a distributor in conical form and its capacity of adjustment, a fragment of the walls of the separating chamber being shown.

Fig. 7 is a horizontal section in planes indicated approximately by the lines 7—7 in Fig. 6.

Fig. 8 is an enlarged fragment of Fig. 6, in section.

Fig. 9 is an elevation partly in vertical midsection of a modified construction of separator having a distributor in disk form with radially movable segments.

Fig. 10 is an enlarged fragment of Fig. 9.

Fig. 11 is a sectional plan of the distributor of Fig. 9 on a larger scale.

Fig. 12 is an enlarged vertical section of a detail of Figs. 9 and 11.

Fig. 13 is a sectional plan of a modification of Fig. 10.

Figs. 9, 10 and 13 are taken from my application, Serial No. 584,140.

Fig. 14 is a fragmentary plan view showing a modified construction of distributor in disk form, the segments being individually radially adjustable. This figure is taken from my application, Serial No. 514,199.

Referring to the drawings, let A represent the main casing of an air separator, C the feed supply or inlet pipe therefor, B the inner casing or receptacle enclosing a separating chamber D, E the feeder or distributor therein, F the fan or blower therefor, G the dust or precipitation chamber, H the dust or fines outlet, I the lower receptacle for the tailings, and J the coarse or tailings outlet.

These parts may be of any usual or suitable construction for utilizing a fluid current to separate a fine or light from coarse or heavy material by causing air or other current to rise through the material as it is distributed in the feed chamber so as to float the lighter particles into the fines chamber and permit the heavier particles to fall and escape through the coarse outlet.

The casing A usually has a flat top, cylindrical sides and a conical bottom, enclosing the chamber G.

The receptacle B is usually an annular wall having a cylindrical center and reversely tapering contracted upper and lower portions affording upper and lower openings communicating with the chamber G within which it is mounted in spaced relation to the outer walls of the casing A. It has a flat annular top wall or shelf F' above which the blades of the fan F revolve to cause current to rise through the separating chamber, descend through the dust chamber and return through the lower opening and again rise through the separating chamber. The lower or inlet opening of the separating chamber is lettered $a$ and the upper or outlet opening is lettered $b$.

Filtering means K are usually disposed in the path of this current to intercept and conduct out of its zone particles floating therein, and usually surround said lower opening to prevent return of fines thereto.

Such filtering means usually consists of two rows of spaced, staggered, hollow troughs extended vertically across the return current passage with their hollow outer sides opposed to the direction of flow of the current for forming current voids in which particles floating in such current may precipitate and be conducted across and below the zone of the current as the latter curves between their spaced edges, so that the fines may be discharged through the fines outlet H, or through an intermediate outlet H' if the separator be constructed with a cone I' intermediate the receptacle I and the outer casing, as is shown in Fig. 1.

The distributor E usually revolves opposite the lower end of the stationary feed pipe C to spread pulverulent material descending through this pipe and distribute it centrifugally in the distributor zone in the chamber D so that it will be thrown across the rising current to enable the latter to extract fine particles.

The driving mechanism revolves the distributor and fan to continuously distribute the material to be separated and to cause current to rise through it in an endless path so that the fines may be separated and withdrawn through the fines outlet and the coarse withdrawn through the tailings outlet.

Any suitable driving means may be provided. In the construction shown the fan or blower F is mounted on the tubular shaft L revolving in a bearing M and has fixed to its upper part a friction wheel N which is frictionally driven by any suitable driving shaft (not shown). In the construction shown in Fig. 1, the distributor is mounted on a tubular shaft T within and concentric with respect to the fan shaft L and surrounding the feed pipe C, which shaft T is mounted on a friction wheel U and is tractionally driven by frictional driving means (not shown). For a detailed illustration and description of suitable friction driving means, reference is made to my aforesaid application, Serial No. 687,359, filed January 19, 1924.

It is desirable to be able to vertically adjust the distributor to suit material being treated or to vary the fineness of the product, and for doing this during operation, and preferably from the exterior of the machine, I preferably provide a male screw-thread on the tubular shaft T and a female screw-thread on its driving wheel U, so that the tubular shaft can be vertically adjusted in the driving wheel U to raise or lower the position of the distributor. Any suitable locking means may be provided to lock the shaft T and wheel U together after such adjustment.

In the construction shown in Fig. 1 the inner shell or receptacle B is contracted at the upper part at B' so that the rising current in the separating chamber is deflected inwardly as it approaches the outlet opening $b$. In this construction there are provided selector baffles to intercept large particles which may be carried in such current and conduct them through or out of its path. As shown, these consist of a circular row of inclined curved plates $c'$ affording a circuitous inward path for the current, causing it to sweep inward and downward to reach the outlet opening $b$. This outlet, as shown, is an annular space between a deflecting cone or baffle $e'$ mounted on the fan shaft L and an inner ring $c^2$ at the bottom of the plates $c'$. The baffle $e'$ may be made of any suitable diameter and the annular outlet $b$ between its periphery and the ring $c^2$ may be given any area desired. In the construction shown its area is reduced so as to accelerate the flow of separated dust or air-borne fines emerging through the outlet and flowing to the blower F. The plates $c'$ may be of the cross-section shown in Fig. 4, the effect of which is to greatly obstruct any current flowing out between them and to divert this current by the action of the curved outer and inner margins of the plates, in the manner well understood in separators of this type; the result is to mainly suppress any outflow between these plates and direct it to the annular outlet opening $b$. The plates also serve to arrest any larger particles carried with the air and direct these downward to their lower ends where such particles may be ejected by the action of radial vanes or beaters $d'$ fastened to the lower margin of the baffle $e'$ and revolving with it, the effect of which is to throw any such particles outwardly or downwardly into the relatively diffused current of air rising through the wider part or selecting zone of the chamber D. The use of such inclined separating plates $c'$ and of such beater vanes $d'$ is optional, these forming no part of the present invention. Where the separating plates $c'$ are not used the space they occupy may be filled by a plate $m$ resting on the top plate F' and projecting down in the form of a truncated cone any suitable distance within the separating chamber. With any such means the outlet opening $b$ is brought below the top of the casing A; but such depression of the outlet is not essential to the present invention, since the outlet from the separating chamber may be at the level of the top plate F', as shown, for example, in Fig. 9.

In Fig. 1 the distributor disk E is an inclined adjustable cone the steepness of which can be varied as by a screw $a'$ and spring $b'$ to vary the angle of discharge of material across the ascending current to suit this angle to the best extraction of fines as the current rises through the material. This may be accomplished by any suitable construction, but I prefer the rotary assembly best shown in Figs. 6 and 7, which comprises an upper plate or ring G', around the shaft T and spaced above a lower plate or ring Q', around the screw $a'$, and a ring of radially adjustable perforated or slotted plates or segments R', around and carried at their inner ends by the screw $a'$ and spring $b'$, and extended at their outer ends beyond the periphery of the lower plate Q', all being detachably connected by screw-threaded bolts $g^2$, adjusted by nuts $h^2$, and all carried by the rotary shaft T. As shown, each plate R' has a slot $i^2$ slidingly engaging the corresponding bolt $g^2$, and each plate R' is radially slidable between the lower plate Q' and a clamping sleeve $n^2$ which encircles its bolt $g^2$, and the plates R' are collectively adjusted to vary their inclination and radial projection by adjusting the nut $j^2$ relatively to the spring $b'$ to lower the inner ends of the plates R' and correspondingly radially project their outer ends to radially vary the distribution and air space around them as desired, whereupon the plates R' are held in their adjusted position by screwing down the nuts $h^2$ until the plates R' are suitably clamped between the clamps $n^2$ and the lower plate Q'.

The distributor E shown in Figs. 1 and 2 has a less range of adjustment than with the dimensions shown in Figs. 6 and 7. The extent of adjustment of the segments is determined by the length of the slots $i^2$ with relation to the dimensions of the bolts $g^2$. The proportions shown in Figs. 1 and 2 are such that with an adjustment from the steepest angle for the conical deflector to the lowest angle or most nearly horizontal position of the segments, the area of the annular space around the distributor, between its periphery and the inner wall of the receptacle B, is diminished about twelve per cent., whereby, with a given driving speed, the selective effect of the ascending current of air flowing through this annular space is varied in a somewhat similar proportion.

With the greater range of adjustment shown in Figs. 6 and 7 there is a larger range of variation in the area of the annular passage. With the position shown in full lines where the diameter of the distributor is most contracted, the radial dimension across the surrounding annular space is indicated at $x$; and when the opposite adjustment is accomplished so that the distributor segments are brought to substantially horizontal position so that the distributor becomes substantially a flat disk as shown in dotted lines, the radial dimension of the surrounding space is reduced to that indicated at $x'$. With the proportions shown, the area of the narrower annular space $x'$ is approximately 68 per cent. of that of the broader annular space $x$. Thus, by adjusting the distributor from its contracted position shown in full lines to its expanded position shown in dotted lines, the area of the air passage around the distributor is diminished about one-third accompanied with a corresponding increase in velocity of the ascending air (at the same speed of the blower). Any adjustment between these two extremes may be readily accomplished, and by means of this capacity for adjustment the effect of the initial separation of lighter material from the heavier particles or tailings is within easy control.

For accomplishing this adjustment with the construction shown in Figs. 1 to 7 it is only necessary to introduce any suitable elongated key down through the feed pipe C, and by turning this key to screw the nut $j^2$ up or down. Such a key is shown at W in Fig. 6, having at its bottom end a socket to engage the nut, and above this a hollow bore to receive the length of the screw $a'$ as the nut is screwed down. The upper end of the key, which may have the usual T handle, projects above the feed hopper $g$, as shown, for example, in dotted lines W' in Fig. 1, where it may be easily grasped by the operator for turning the key.

Thus the diameter of the distributor, and thereby the area of the air space around it, is adjustable from the exterior of the casing by means acting axially of the apparatus, that is, in the axis of rotation, and without the necessity of having workmen enter through manholes in the casing A and receptacle B for accomplishing the adjustment of the diameter of the distributor.

Another embodiment of the invention is shown in Figs. 9, 11 and 12. In these figures the same letters and references as hereinbefore are used to designate like or corresponding parts. The fan or blower F and the distributor E are here both carried by the same tubular shaft L. This shaft is driven by bevel gearing from a drive shaft P, it being understood that any variable speed drive may be applied, as desired. The separating chamber D, instead of being contracted at its upper part by a tapering wall B' as in the first construction, is here provided with an internal cone B² mounted within it and spaced from its outer wall B, as shown; this, however, is not essential and forms no part of the invention.

In this construction the distributor E consists of a flat plate or disk and is connected to the shaft L through the medium of an upper plate or disk E' having its hub fastened to the shaft by a set screw 12, and to which the distributor disk is connected by suspending bolts or posts 13. The distributor is located below and opposite the feed conduit C where it receives the material descending through this conduit and concentrically distributes it through the contracted lower portion of the inner casing or receptacle B.

To enable the distributor to be varied in diameter I provide it with a ring of radially adjustable segments 14, which segments can be radially adjusted to vary the current space around the distributor through which current upflows past the distributor zone. These plates are preferably overlapped and slidingly mounted, and are preferably adjusted by mechanical connections to insure their simultaneous uniform operation.

In the construction shown in these figures the segmental plates are overlapping and are adjusted radially, being guided by having radial slots 15 which engage studs 16 and may also engage the upright suspension bolts 13. Around each bolt 13 is a sleeve 17 so mounted that it may be reciprocated or caused to oscillate around the bolt and formed at its upper part as a toothed pinion or sector 18, and at its lower part having a crank arm 19, the end of which has a pin or stud 20 having slidable connection with a transverse slot 21 in the corresponding plate 14, so that as the cranks are oscillated, the plates are moved outward or inward. In order that all the cranks may be oscillated or reciprocated together to uniformly simultaneously adjust the segments of the distributor for radially varying the space around them, the pinions 18 all mesh with a gear 22 carried on the bottom end of a tubular shaft L' mounted concentrically of, and within the shaft L, and normally rotating therewith. The adjusting shaft L' is thus arranged concentrically of and between the supply pipe C and the tubular drive shaft L.

According to this feature of the invention the adjustment of the distributor may be accomplished from outside the casing and at the top thereof by rotating the shaft L' relatively to the shaft L. For this purpose the shaft L' has at its upper end above the top of the shaft L, a collar or wheel 24 fastened to it by a screw 25 which may be engaged by any suitable key or lever as 24' for turning the shaft L' while the shaft L is stationary. The shaft L' is thus oscillated relatively to the shaft L to partially revolve the gear 22 and by rotating the pinions 18 to swing the crank arms 19. After adjustment it is necessary to lock the shaft L' to the drive shaft L so that they must turn together. For locking the two shafts together any suitable lock may be provided, that shown consisting of notches 31 at the top of the shaft L engaged by the screw 25 or any projection on the shaft L', so that by dropping this shaft enough to cause such projection to enter one of the notches 31 the two shafts are locked together, the face of the teeth on the gear 22 being extended vertically sufficiently to permit of this movement without unmeshing the gear from the pinions. The notches 31 are conveniently formed in the top of a sleeve 32 fastened to the shaft L by bolts 33. For getting access to the collar 24 and locking means, the usual housing R for the gearing and for supporting the upper bearing of the drive shaft may be provided with one or more openings 34. Thus, to adjust the distributor it is necessary to apply sufficient force to lift the tooth 25 out of the notch 31 and then to turn the shaft L', afterward dropping the tooth into another coinciding notch.

In Fig. 13 is shown a slight structural variation from the precise construction shown in Figs. 9 to 12. The segments 14 are here located farther out, forming a distributor of larger diameter, and the radial slots 15 are guided on two studs 16 and 16'. The crank arms 19 are connected by links 35 to the respective segments. The means for rotating the sleeves 17 to turn the crank arms is the same as already described.

The construction as thus described with reference to Figs. 9 to 13 enables the adjustment of the diameter of the distributor to be effected from outside the casing and above the top thereof and provides one locking means for the entire assembly of adjustable segments instead of requiring each segment to be separately clamped fast, according to the construction shown in Figs. 6 and 7.

In Figs. 9, 11 and 12 there is shown also an assembly of segmental plates applied to the disk E', whereby this disk may serve as an adjustable baffle for varying the area of the annular space around it within the casing and thereby controlling the velocity of the outflowing current through such space. Here the construction of adjustable segments and the means for moving them is the same as that already described for the distributor E, the difference being that the annular space around the baffle plate E' is occupied only by the finer separated material borne upwardly by the current, and is independent of the separation of the lighter from the heavier material which occurs in the distribution zone. The segmental plates are indicated at 14', and in the construction shown they are precise counterparts of the plates 14. For operating them the reciprocatory or oscillatory sleeve 17 has an upper crank arm 19', which may be a duplicate of the lower arm 19, the end of which has a pin or stud 20' having slidable connection with the transverse slot 21' in the plate 14'. Thus as the adjusting shaft L' is turned to oscillate the sleeve 17, both the lower plates 14 and the upper plates 14' are simultaneously displaced outwardly or inwardly.

The rotary assembly comprising the baffle disk E' and its segments 14' may be located at any desired height or level within the separating chamber D, except that it should be at a material distance below the outlet b and at a material distance above the inlet a, and may be made of any size or diameter required to accomplish the purpose that is desired.

While it is practically important that the assembly constituting the adjustable distributor E shall be rotative, this is not necessary in the case of the baffle disk E' and its plates 14'. These may be mounted on any stationary support that may be provided within the separating chamber so that they constitute an adjusting assembly which may be stationary instead of rotative. It is, however, more convenient to utilize the revolving drive shaft L for supporting any such assembly whereby it is made rotative, although its rotation performs no function such as does the rotation of the distributor E.

Fig. 14 shows another construction of adjustable distributor whereby its radial dimension may be varied to vary the space through which the outthrown material is projected and thereby to vary the annular current passage around the distributor and consequently to vary the initial separation effect in the distribution zone. Here the distributor is made radially expansive by equipping it will radially adjustable sections 14 which can be set inwardly or outwardly to vary its radius. The segments are provided with radial slots 15 engaged by bolts or fastening screws 36 mounted on the distributor disk E, which otherwise is of the same construction and mounting as shown in Figs. 7 and 8. To adjust the distributor the bolts 36 are slackened, the segments set out or in to the required radius and the bolts again tightened. This construction is less advantageous than the two other embodiments already described, in that the segments are not capable of collective or simultaneous adjustment, and the adjustment cannot be performed from outside the casing, but requires that manholes be provided for permitting a workman to enter or reach within the outer casing and the inner shell or receptacle.

In operating a separator constructed according to this invention, the tailings are tested to determine the completeness of separation of the fines, and the distributor may then be adjusted to vary the percentage of fines separated from the tailings.

What I claim is:

1. In a separator comprising a casing enclosing a separating chamber having a lower current inlet and an upper current outlet, material supply means having an outlet orifice within said casing at a level materially lower than said current outlet for supplying material to be separated to said separating chamber, and a blower for causing a fluid current to enter at said inlet and flow up through said separating chamber and said outlet to float fine material from said separating chamber, the combination therewith of a rotary, adjustable, annular baffle comprising a plurality of segmental plates disposed concentrically within said separating chamber at a level materially lower than said current outlet so as to be adjacent the outlet orifice of said material supply means, and having outer edges spaced inwardly from said casing for defining the space through which such current may upflow within said separating chamber past said outer edges, said plates being adjustable by inward and outward movement, to vary the area of such space at the approximate level of the outlet orifice of the material supply means and thereby vary the current therein so as to vary the separation as the material is carried past the outer edges of the plates, and means for collectively effecting the adjusting movements of the segments.

2. In a separator comprising a casing enclosing a circular separating chamber having a lower current inlet and an upward current passage and an upper current outlet, supply means for supplying material to be separated in said passage, and blower means for causing a fluid current to enter said chamber through said inlet and flow up through said passage and through said outlet to separate and float fine material from said chamber, the combination therewith of rotary material distributor means within and spaced from the wall of said chamber and below and opposite said supply means for receiving such material from said supply means and distributing such material in said passage, comprising a plurality of segments movably adjustable outwardly and inwardly to vary the outward projection of the distributor whereby to vary the area of the space around the distributor, to vary the current therein, to vary such separation.

3. In a separator comprising a casing enclosing a circular separating chamber having a lower current inlet and an upward current passage and an upper current outlet, supply means for supplying material to be separated in said chamber, and blower means for causing a fluid current to enter said chamber through said inlet and flow up through said passage and through said outlet to separate and float fine material from said chamber, the combination therewith of a rotary assembly of a plurality of plates movable outwardly and inwardly within and concentric of said chamber and having outer edges spaced inwardly from said casing for defining between said edges and said casing the space through which such current is permitted to flow past said plates, said plates collectively movable, their movements serving to vary the area of such space whereby to vary the fineness of such separation.

4. A separator according to claim 1, of which the means for collectively adjusting the segmental plates of the baffle is operable from the exterior of the separating chamber.

5. A separator according to claim 1, of which the means for adjusting the segmental plates of the baffle is accessible at the aixal center of the separator.

6. A separator according to claim 1, of which the means for moving the segmental plates of the baffle is accessible from the top of the separator chamber.

7. A separator according to claim 1, of which the supply means includes a feed chute, and of which the means for adjusting the segmental plates of the baffle is accessible through said feed chute.

8. A separator according to claim 2, the distributor being a cone of segments, and means for adjusting it engaging the segments at the apex of the cone, to move up or down the inner ends of the segments, whereby to vary the conicity of the distributor and alter its diameter.

9. A separator according to claim 2, the distributor being a cone of segments, and means for adjusting it engaging the segments at the apex of the cone, comprising a central screw, a spring lifting the inner ends of the segments, and a nut for forcing them down against the stress of the spring.

10. A separator according to claim 1, of which the adjustable baffle comprises a disk to carry the segmental plates, and part of said means for moving the plates outwardly and inwardly relatively to the disk.

11. A separator according to claim 1, of which the adjustable baffle comprises a disk carrying the segmental plates, and means for fastening the plates to the disk in their adjusted positions, the said means for moving the plates outwardly and inwardly relatively to the disk being capable of effecting an adjustment only when the plates are freed by loosening the fastening means.

12. A separator, as defined by claim 1, of which the baffle includes a support to serve as a mounting means for the segmental plates, and of which the means for adjusting the plates comprises a central gear, pinions meshing therewith, and operating connections between the pinions and the plates whereby they may be collectively moved by oscillating the central gear.

13. A separator, as defined by claim 1, of which the baffle includes a support to serve as a mounting means for the segmental plates, and of which the means for adjusting the plates comprises a member reciprocatory with respect to the support, and connections between said member and said plates whereby they may be collectively moved by reciprocating the member.

14. A separator, as defined by claim 1, of which the baffle is adapted to serve as a rotary distributor of material fed through the supply means, and of which the means for supporting, rotating and adjusting the distributor comprises a mounting element for the segmental plates, a drive-shaft for the mounting element, concentric with respect to the supply means, an adjusting member concentric with respect to and reciprocatory relative to the drive-shaft, and means connecting the plates with the adjusting member whereby they may be moved by a relative reciprocation of said member and said shaft one with respect to the other.

15. In a separator, comprising a separating chamber, having a lower current inlet, an upward current passage and an upper current outlet, and blower means for causing a current to flow through the inlet, upward passage and outlet for separating and floating fine material from the chamber, material supply means having a supply orifice within the separating chamber and between said inlet and outlet, for supplying material to be separated within the separating chamber, the combination therewith of a combined material distributor and adjustable baffle within the separating chamber, concentric with said upward passage, for defining the space therein through which said current may upflow and for distributing said material across said space, said distributor and baffle comprising a rotary assembly of elements including a support and segments which are adjustable by inward and outward movement with respect thereto for varying the effective diameter of the segments so as to thereby increase their effectiveness as a baffle and vary the separation therein by varying the width of said space, and means for collectively effecting the adjusting movements of the segments.

16. In a separator, comprising a casing enclosing a separating chamber having a lower current inlet, an upward current passage and an upper current outlet, material supply means having an outlet orifice within said separating chamber at a level materially lower than said current outlet, for supplying material to be separated in said separating chamber, a blower for causing a fluid current to enter at said inlet and flow up through said passage and said outlet to separate and float fine material from said separating chamber, and distributor means within and spaced from the wall of said chamber and below and opposite said orifice, for receiving such material therefrom and distributing said material in said upward passage; the combination therewith of a rotary, adjustable, annular baffle within said separating chamber and below said upper outlet and above said lower inlet, comprising a plurality of segmental plates disposed concentrically within said upward passage and having edges spaced from adjacent walls of the separator, for defining the space within said separating chamber through which such current may upflow past said edges, said plates being adjustable by outward and inward movement to vary said space and thereby vary the current within the separating chamber, so as to vary the separation, and means for collectively effecting the adjusting movements of the segments.

GEORGE HOLT FRASER.